US009032991B2

(12) United States Patent
Broker et al.

(10) Patent No.: US 9,032,991 B2
(45) Date of Patent: May 19, 2015

(54) FIELD ADJUSTABLE GAS VALVE AND METHOD OF CONTROL

(75) Inventors: John Broker, Warrenton, MO (US);
Ryan Jensen, St. Louis, MO (US);
Mark H. Stark, St. Louis, MO (US);
Mike Santinanavat, Chesterfield, MO (US); Don Blessing, Manchester, MO (US); Shweta Annapurani Panimadai Ramaswamy, Maryland Heights, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 13/099,772

(22) Filed: May 3, 2011

(65) Prior Publication Data

US 2012/0279584 A1    Nov. 8, 2012

(51) Int. Cl.
*G05D 7/06* (2006.01)
*F23N 1/00* (2006.01)

(52) U.S. Cl.
CPC .............. *F23N 1/002* (2013.01); *G05D 7/0623* (2013.01); *F23N 2035/14* (2013.01); *F23N 2035/16* (2013.01); *F23N 2035/20* (2013.01); *F23N 2037/10* (2013.01); *F23N 2041/02* (2013.01)

(58) Field of Classification Search
CPC . F23N 1/002; F23N 2035/14; F23N 2035/16; F23N 2035/20; F23N 2037/10; F23N 2041/02; G05D 7/0623
USPC .................. 137/486, 487.5; 251/30.02, 30.05
See application file for complete search history.

(56) References Cited

U.S. PATENT DOCUMENTS

| 5,062,446 | A   | * | 11/1991 | Anderson ...................... 137/468 |
| 6,161,535 | A   |   | 12/2000 | Dempsey et al. ......... 126/110 R |
| 6,283,115 | B1  |   | 9/2001  | Dempsey et al. ......... 126/110 R |
| 7,296,595 | B2  |   | 11/2007 | Santinanavat et al. ... 137/614.19 |
| 7,731,096 | B2  |   | 6/2010  | Lorenz et al. ................. 236/1 C |
| 2008/0297288 | A1 | * | 12/2008 | Irwin ........................... 335/254 |
| 2010/0009303 | A1 |   | 1/2010  | Santinanavat et al. .......... 431/12 |

FOREIGN PATENT DOCUMENTS

WO    PCT/US12/22400    2/2012

OTHER PUBLICATIONS

"MAXITROL—EXA Valve Series Operating Instructions", www.maxitrol.com; 2009; pp. 1-4.
U.S. Appl. No. 61/444,956, filed Feb. 21, 2011, Stark et al.
U.S. Appl. No. 13/031,517, filed Feb. 21, 2011, Broker et al.

* cited by examiner

*Primary Examiner* — William McCalister
(74) *Attorney, Agent, or Firm* — Harness, Dickey & Pierce, P.L.C.

(57) ABSTRACT

A valve unit includes a valve member that moves relative to a valve seat in response to a magnetic field generated by a coil. An input signal to the coil controls the extent of movement of the valve member relative to the valve seat, to control a gas flow rate therethrough. The gas valve unit also includes a setting adjustment device that provides a setting adjustment input utilized for calibrating or adjusting at least one gas flow rate. A valve controller is configured to receive an activation signal and to responsively send an input signal to the coil to move the valve member and establish at least one desired gas flow rate corresponding to the activation signal, wherein the valve controller is configured to adjust the input signal to the coil based on the setting adjustment input, to thereby enable field adjustment of at least one gas flow rate.

20 Claims, 5 Drawing Sheets

US 9,032,991 B2

FIELD ADJUSTABLE GAS VALVE AND METHOD OF CONTROL

FIELD

The present disclosure relates to systems for control of a gas fired appliance having a gas valve, and more particularly relates to gas valves for control of gas flow to such an appliance.

BACKGROUND

The statements in this section merely provide background information related to the present disclosure and may not constitute prior art.

A gas-fired, warm air furnace that operates at two fixed gas flow rates is generally referred to as a two-stage furnace. Two stage furnaces are frequently selected by homeowners over single stage furnaces because they offer increased performance and comfort. However, in two stage furnaces, the furnace controller is only configured to control a two stage gas valve that is operable at a fixed high gas flow rate and a fixed low gas flow rate. Such two stage gas valves are not capable of providing for adjustable gas flow rates. In multi-stage furnaces, a furnace controller may be configured to request operation of a modulating gas valve at a particular operating capacity level or gas flow rate. The operating capacity level requested by such furnace controllers could range from full capacity operation of the gas valve to as low as 30 percent of full capacity operation. However, the gas flow rate settings for the above gas valves are typically set at the factory, and are not field adjustable. Accordingly, a need still exists for an improved variable flow gas valve and associated control for such gas valves.

SUMMARY

Further areas of applicability will become apparent from the description provided herein. It should be understood that the description and specific examples are intended for purposes of illustration only and are not intended to limit the scope of the present disclosure.

According to one aspect of the present disclosure, one or more embodiments of a gas valve unit are provided. In one embodiment, the gas valve unit includes a valve member that moves relative to a valve seat in response to a magnetic field generated by a coil. An input signal to the coil controls the extent of movement of the valve member relative to the valve seat, to control a gas flow rate through the gas valve unit. The coil may be part of a stepper-motor having one or more coils, which displace the valve member based on activation of the coils. Alternatively, the coil may be a part of a solenoid that is configured to move the valve member based on the magnitude of the magnetic field generated by the coil. The various embodiments of a gas valve unit also include a setting adjustment device that provides a setting adjustment input utilized for calibrating or adjusting at least one desired gas flow rate. A valve controller is in communication with the setting adjustment device and the coil. The valve controller is configured to receive an activation signal and to responsively send an input signal to the coil to move the valve member and establish at least one desired gas flow rate corresponding to the activation signal, wherein the valve controller is configured to adjust the input signal to the coil based on the setting adjustment input, to thereby enable field adjustment of the at least one gas flow rate.

DRAWINGS

The drawings described herein are for illustration purposes only and are not intended to limit the scope of the present disclosure in any way.

Corresponding reference numerals indicate corresponding parts throughout the several views of the drawings.

DETAILED DESCRIPTION

Figure 1:
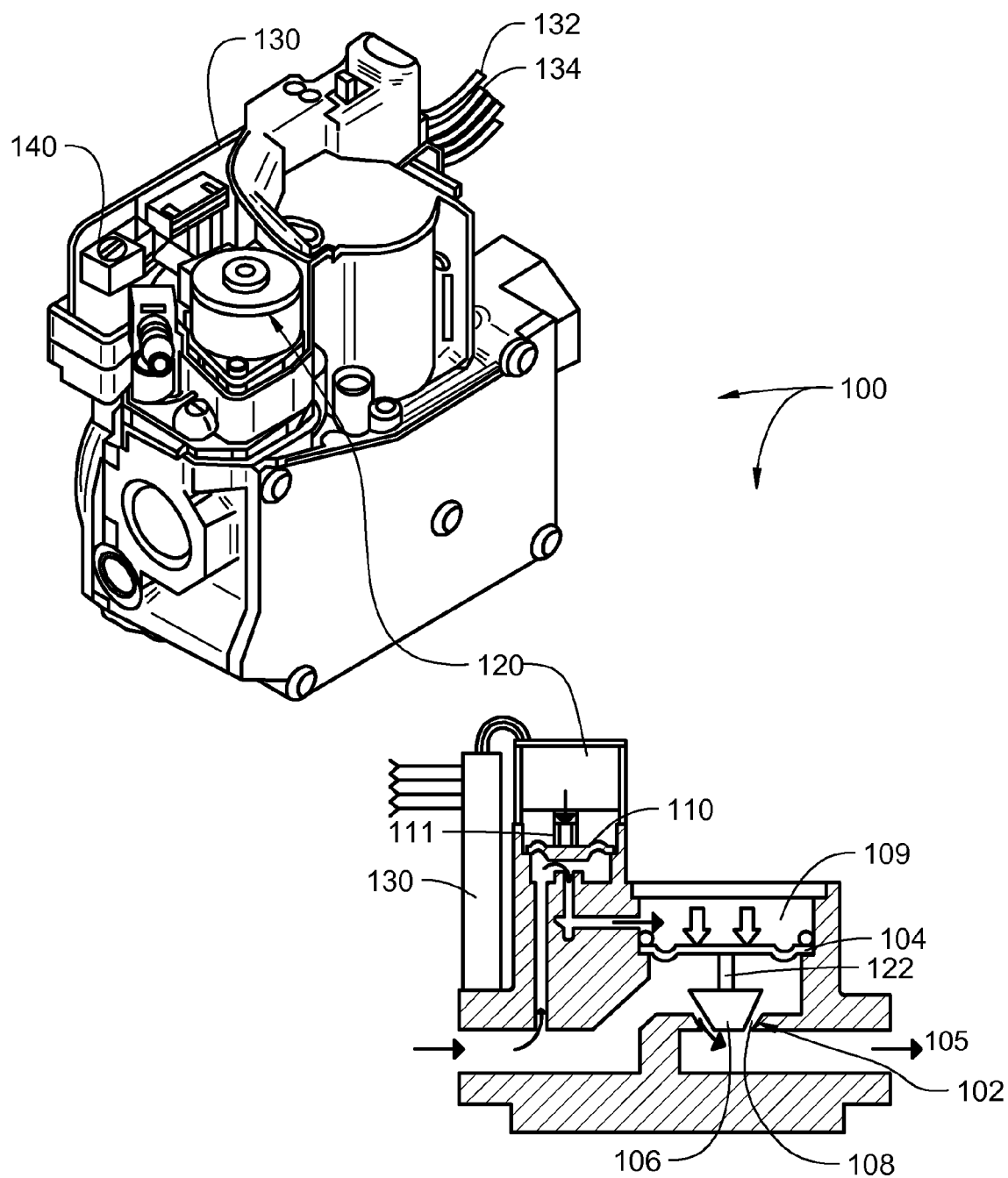
FIG. 1 shows a perspective view and a schematic cut-away view of one embodiment of a stepper-motor regulated gas valve control, according to the principles of the present disclosure.

The following description is merely exemplary in nature and is not intended to limit the present disclosure, application, or uses. It should be understood that throughout the drawings, corresponding reference numerals indicate like or corresponding parts and features.

In the various embodiments of the present disclosure, a gas valve unit is provided for controlling the gas flow rate to a combustion apparatus. The gas valve unit comprises a valve member that moves relative to a valve seat in response to a magnetic field generated by a coil. An input signal to the coil controls the extent of movement of the valve member relative to the valve seat, to control a gas flow rate through the gas valve unit. The coil may be part of a stepper-motor having one or more coils, which displace the valve member based on activation of the coils. Alternatively, the coil may be a part of a solenoid that is configured to move the valve member based on the magnitude of the magnetic field generated by the coil. The various embodiments of a gas valve unit also include a setting adjustment device that provides a setting adjustment input utilized for calibrating or adjusting at least one desired gas flow rate. A valve controller is in communication with the setting adjustment device and the coil. The valve controller is configured to receive an activation signal and to responsively send an input signal to the coil to move the valve member and establish at least one desired gas flow rate corresponding to the activation signal, wherein the valve controller is configured to adjust the input signal to the coil based on the setting adjustment input, to thereby enable field adjustment of the at least one gas flow rate.

As shown in FIG. 1, one embodiment of a gas valve unit 100 includes a valve member 122 that moves relative to a valve seat 102 in response to a magnetic field generated by a coil 120. The coil 120 is part of a stepper motor that displaces a spring 111 for adjustably biasing servo-regulator diaphragm 110, which controls the fluid pressure in chamber 109 applied to a main regulator diaphragm 104, where the mechanical linkage to the valve member 122 causes the valve element 106 to move and vary an opening area 108 relative to the valve seat 102. An input signal to the coil 120 of the stepper motor biases servo-regulator diaphragm 110 and controls the extent of movement of the valve member 122 relative to the valve seat 102, to establish a desired gas flow rate. The setting of at least one desired gas flow rate (e.g., input signal to the coil 120) may be set at the time of manufacture of the gas valve unit 100. The various embodiments of a gas valve unit 100 are also configured to receive an activation signal, and to responsively control an input to the coil 120 to establish at least one desired gas flow rate to an outlet 105 of the gas valve unit 100. In the various embodiments of a gas valve unit 100, the input to the coil 120 is controlled to establish at least a high-capacity gas flow rate to an outlet 105. In some embodiments, the gas valve unit 100 may be configured to receive a low-stage activation signal and responsively control the input signal to the coil 120 to establish a low capacity gas flow rate to the outlet 105. The gas valve unit 100 may also be configured to receive an activation signal that includes information indicative of a particular gas flow rate, which is between the high-capacity gas flow rate and the low-capacity gas flow rate. Accordingly, the various embodiments of a gas valve unit 100 are configured to establish at least one desired gas flow rate upon receiving an activation signal, which may be provided by a system controller for a heating unit, as explained below.

The various embodiments of a gas valve unit 100 are connectable to and operable with a system controller 20 for a furnace or heating unit 50 (FIG. 2), where the system controller 20 initiates operation of the heating unit 50 based on input signals from a single-stage, two-stage or other type of thermostat. In response to an input signal from one of the above thermostats, the system controller 20 may provide an activation signal to request a high capacity gas flow rate, a low capacity gas flow rate, or a variable rate therebetween. To better illustrate the operation of the various embodiments of a gas valve unit, an example of a system controller 20 is shown in FIG. 2 provided for purposes of explanation.

Figure 2:
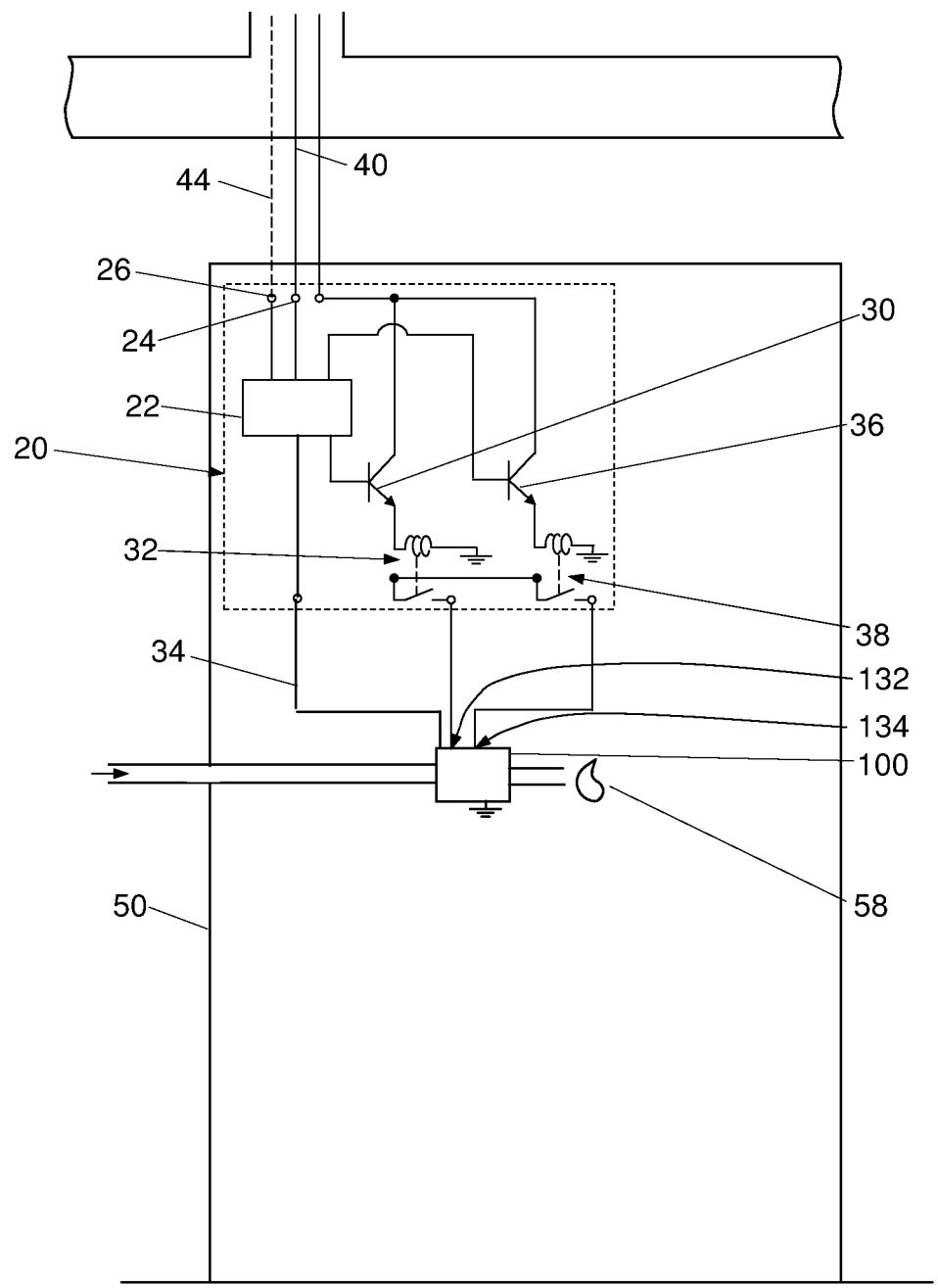
FIG. 2 shows a schematic diagram of a heating system controller, shown within a heating apparatus that includes the gas valve unit in FIG. 1, according to the principles of the present disclosure.

Referring to FIG. 2, the system controller 20 includes a microcontroller 22, and a first input terminal 24 for receiving a heat activation signal from a wire 40 connected to a thermostat (e.g., a "W" terminal on the thermostat). The system controller 20 may be a variable heating controller, having a second terminal 26 for receiving a low stage heat activation signal where a two-stage thermostat is used and connected to the system controller 20 via a wire 44. In response to a thermostat activation signal, the system controller 20 will signal the gas valve unit 100 to establish a gas flow to a burner 58. Where the system controller 20 is a two-stage controller, the system controller 20 may be configured to send an activation signal to the gas valve unit 100 to establish a low-stage gas flow rate for a predetermined time period, and to thereafter signal the gas valve unit 100 to establish a high-stage gas flow rate after expiration of the time period. Such a system controller 20 may include a first switching means 30 for switching a voltage source "V" to a relay device 32 that switches voltage to a first connection 132 on the valve unit 100 to establish a low stage gas flow rate, and a second switching means 36 for switching voltage to a relay device 38 that switches voltage to a second connection 134 on the valve unit 100 to establish a high stage full-capacity gas flow rate to the burner 58. Alternatively, the system controller 20 may provide (via wire 34) a current signal or pulse-width-modulation signal to the gas valve unit 100, to indicate a desired operating capacity level. For example, the system controller 20 may generate a 180 milliamp signal where maximum heating operation is desired, a 20 milliamp signal where minimum heating operation is desired, and any milliamp signal therebetween for variable heating operation. Accordingly, an exemplary system controller 20 may be configured to respond to one or more thermostat activation signals by signaling a gas valve unit 100 to establish a high capacity gas flow rate, a low capacity gas flow rate, or one or more variable gas flow rates therebetween.

In the first embodiment shown in FIG. 1, the gas valve unit 100 is operated by a stepper-motor. The stepper-motor operated gas valve unit 100 includes a main diaphragm 104 disposed in a main regulator diaphragm chamber 109. The stepper motor includes at least one coil 120 for generating a magnetic field that biases servo-regulator diaphragm 110 for controlling fluid pressure applied to a main regulator diaphragm 104, which causes the valve member 122 and valve element 106 to move relative to the valve seat 102. The servo-regulator diaphragm 110 therefore controls the fluid pressure applied to the main regulator diaphragm 104, to control the rate of gas flow through valve opening 108 to the valve outlet 105. The coil 120 associated with the stepper motor is configured to generate a magnetic field to cause the stepper motor to move in a stepwise manner to bias the servo-regulator diaphragm 110 for regulating flow to the main regulator diaphragm 104 to thereby control the gas flow rate through the gas valve unit 100.

The first embodiment accordingly includes a stepper-motor having a coil 120, which provides control over the extent of movement of the valve member 122 and valve element 106 relative to the valve seat 102 to establish operation at a low capacity gas flow rate, or a high full-capacity gas flow rate, or even modulated gas flow between the high and low gas flow rates. In the particular embodiment shown in FIG. 1, the gas valve unit 100 includes a stepper motor in which at least one coil 120 is configured to bias servo-regulator diaphragm 110 and cause the valve member 122 to move for varying the gas flow rate. Accordingly, the embodiment in FIG. 1 is not direct-acting, in that the valve member 122 is not directly moved by the coil 120, but rather by a mechanical linkage with the main regulator diaphragm 104 that displaces the valve member 122. The particular input signal applied to the stepper motor coil 120 is that which provides a desired low-capacity gas flow rate, high-capacity gas flow rate, or a variable gas flow rate therebetween. However, other embodiments of a gas valve unit are contemplated in which input to a different coil moves a valve member to vary a gas flow rate, as explained below.

Figure 3:
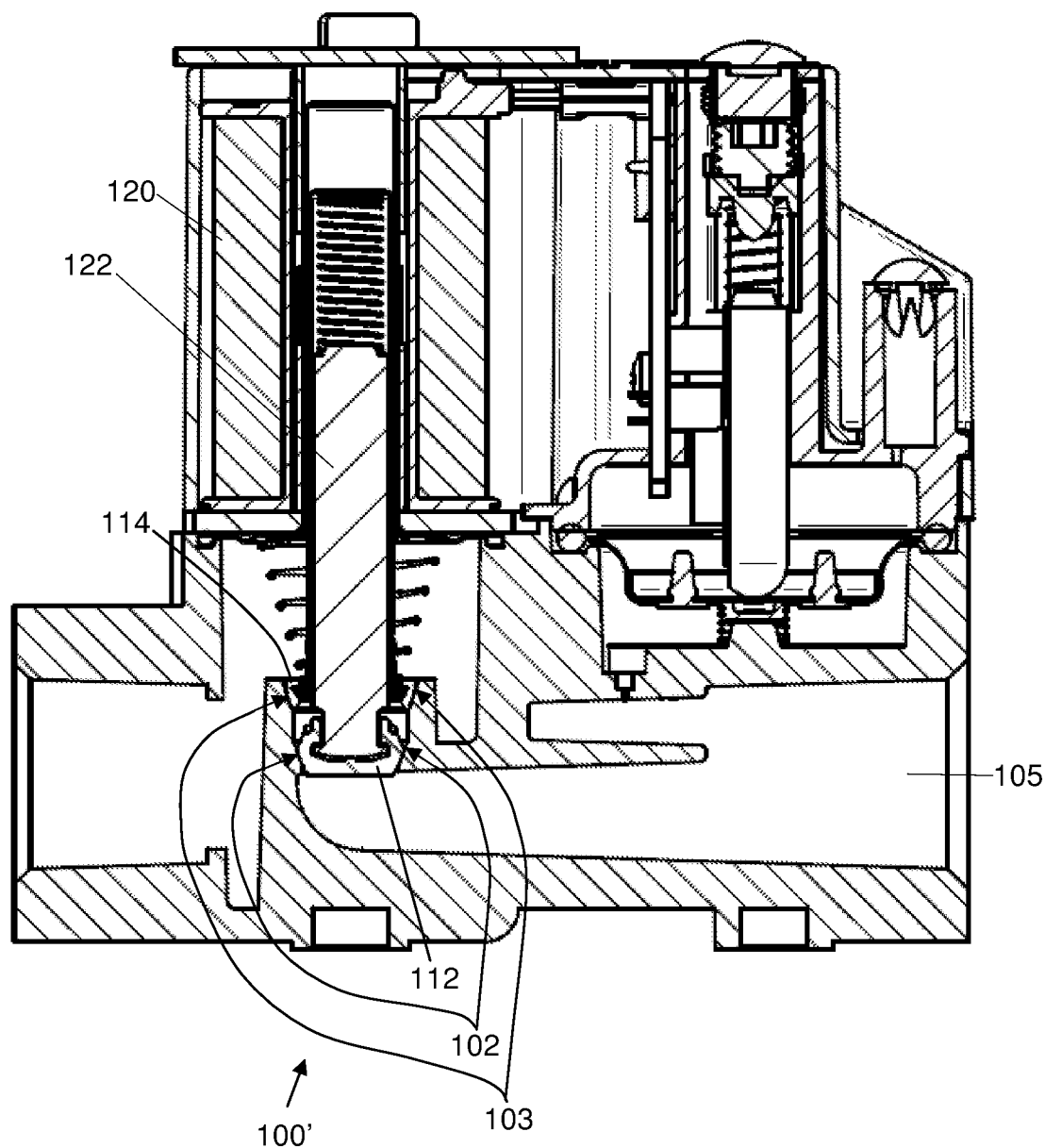
FIG. 3 shows a cross-sectional view of a second embodiment of a gas valve unit for controlling gas flow within a heating apparatus, according to the principles of the present disclosure.
Figure 4:
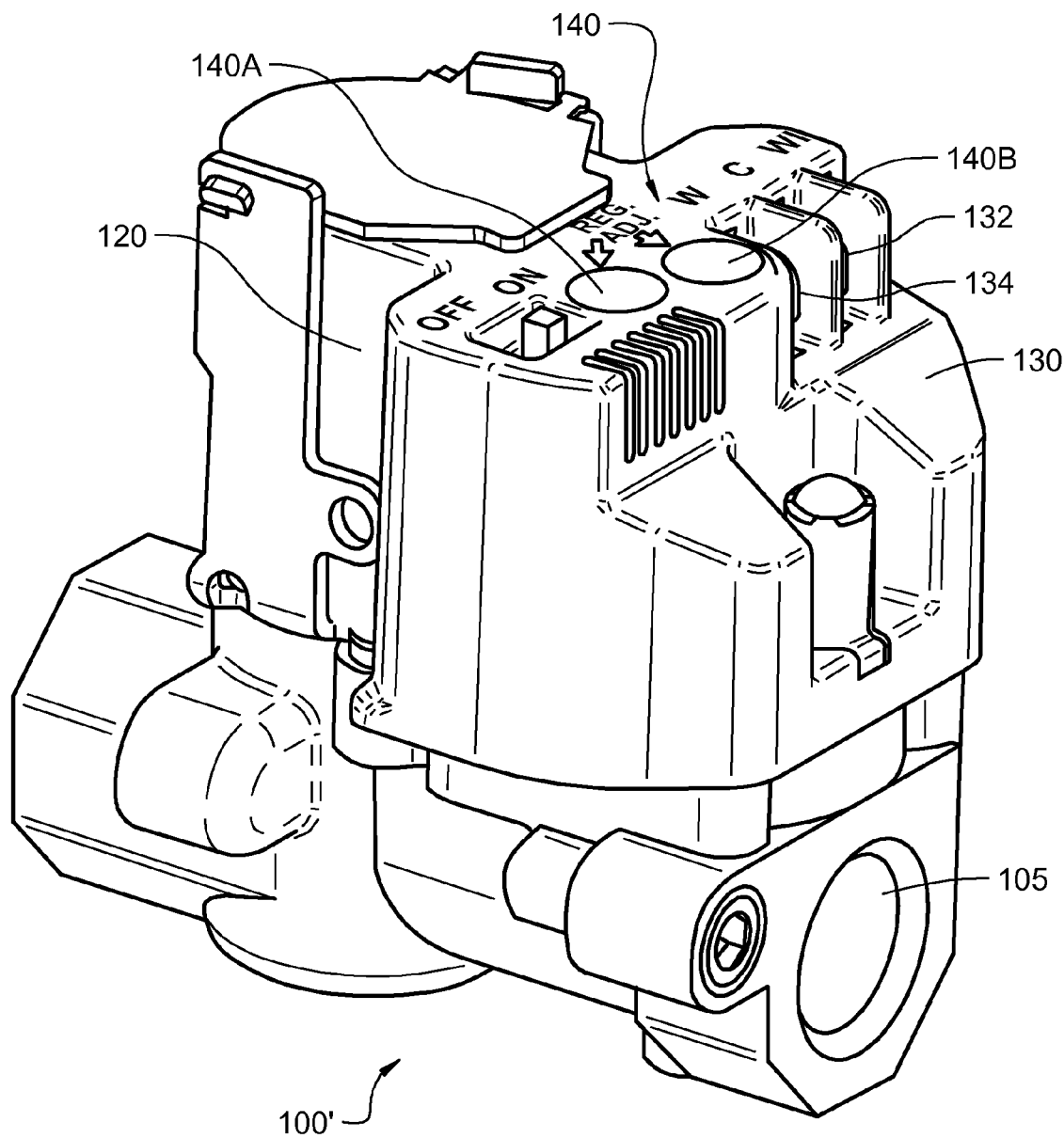
FIG. 4 shows a perspective view of the gas valve unit in FIG. 3, according to the principles of the present disclosure.

Referring to FIGS. 3-4, a second exemplary embodiment is shown of a gas valve unit 100' for controllably adjusting gas flow rates within a heating unit. Much like the first embodiment, the gas valve unit 100' includes a movable valve member 122 for controllably adjusting the gas flow rate. In response to a magnetic field generated by a solenoid coil 120, the valve member 122 moves relative to the valve seat 102 to vary the gas flow rate to the valve outlet 105. The valve member 122 is configured to move a controlled amount (to vary the gas flow rate) based on a magnetic field that is established by an input voltage applied to the solenoid coil 120.

Specifically, the exemplary gas valve unit 100' in FIGS. 3-4 includes a first valve seat 102, a second valve seat 103 substantially co-aligned with the first valve seat 102, and an outlet 105. The gas valve unit 100' includes a first valve element 112 that is spaced from the first valve seat 102 when the first valve element 112 is in an open position, and seated against the first valve seat 102 when the first valve element 112 is in a closed position. The gas valve unit 100' includes a second valve element 114 that is substantially co-aligned with the first valve element 112 and moveable relative to the second valve seat 103, where the second valve element 114 is spaced from the second valve seat 103 when the second valve element 114 is in an open position, and seated against the second valve seat 103 when the second valve element 114 is in a closed position. The gas valve unit 100' further includes a valve member 122 that operatively moves the first valve element 112 and second valve element 114 in response to a magnetic field generated by the solenoid coil 120. The valve member 122 is configured to move the first and second valve elements 112, 114 relative to at least the second valve seat 103 to vary an opening area therebetween. More preferably, the valve member 122 is configured to move a first distance to pull the first valve element 112 away from a closed position against the first valve seat 102 towards an open position, and to move beyond the first distance to pull the second valve element 114 away from a closed position against the second valve seat 103 and towards an open position. The valve member 122 is configured to move a controlled amount based on the magnetic field generated by the solenoid coil 120, to vary the opening area to provide a desired high-capacity gas flow rate through the valve unit 100'. One example of such a valve design is disclosed in U.S. Provisional Patent Application Ser. No. 61/444,956 filed on Feb. 21, 2011, which is entitled "Valves And Pressure Sensing Devices For Heating Appliances" and is incorporated herein by reference.

It should be noted that in the various embodiments of a gas valve unit, establishing a desired high-capacity gas flow rate or low-capacity gas flow rate is equivalent to establishing a corresponding outlet pressure at the outlet 105 of the gas valve unit 100. Specifically, to achieve a desired high-capacity or low-capacity gas flow rate at a downstream location of a burner 58 (as shown in FIG. 2), the gas valve unit 100 in FIG. 1 has a valve member 122 that moves relative to the valve seat 102 to establish an outlet pressure at the outlet 105 that yields a corresponding gas flow rate downstream at the burner. Table 1 shown below illustrates various exemplary outlet pressure levels that are approximately equivalent to the listed gas flow rates. The gas flow rates are expressed as a percent of full capacity gas flow for the gas valve unit 100.

TABLE 1

| Pressure (inches water column) | Capacity (% full capacity flow for Natural Gas) |
|---|---|
| 5.00 | 100 percent |
| 3.61 | 85 percent |
| 1.25 | 50 percent |
| 0.45 | 30 percent |
| 0.20 | 20 percent |

Accordingly, the various embodiments of a gas valve unit (FIG. 1, FIGS. 3-4) are configured to control an input to a coil 120 for generating a magnetic field that causes a valve member 122 to move and establish an outlet pressure at the outlet 105 that corresponds to and/or provides the desired gas flow rate. In the above described embodiments, the coil 120 may be a component of a solenoid or a stepper-motor that causes the valve member 122 to be moved in response to an input signal to a coil 120. To control the input signal, the various embodiments of a gas valve unit 100 further include a valve controller 130 for controlling the input to the coil 120 for controlling the gas flow rate of the gas valve unit 100, as explained below.

The above embodiments shown in FIG. 1 and FIG. 4 preferably include a valve controller 130. The valve controller 130 is configured to receive an activation signal (via 132, 134) from a furnace controller for requesting operation of the gas valve unit 100. The valve controller 130 is configured to identify the activation signal as a request to establish a low capacity gas flow rate (e.g., low stage operation), a high capacity gas flow rate (e.g., high stage), or a select gas flow rate based on a reference value (e.g., a pulse width modulation value or current value corresponding to a select capacity level).

Where an activation signal received by the gas valve unit 100 in FIG. 1 is a request to establish a low capacity gas flow rate (e.g., low stage) or a high capacity gas flow rate (e.g., high stage), the valve controller 130 determines an input signal to the coil 120 that will establish the requested low or high capacity gas flow rate. Where the activation signal received by the gas valve unit 100 is a milliamp current signal that is indicative of a desired operating capacity level, a current to voltage converter circuit may convert the milliamp signal provided by a system controller 20 (FIG. 2) to a reference signal (e.g., 0 to 5 volt signal) that is used to determine an input signal to the coil 120. Likewise, for a pulse-width-modulated signal, the duty cycle (i.e. time that the signal is 'high' versus 'low') may be converted to a 0 to 5 volt reference signal.

Where the coil 120 is part of a stepper motor as in FIG. 1, the valve controller 130 is configured to determine an input to the coil 120 associated with a particular motor step value that corresponds to a low or high-capacity gas flow rate, where the coil 120 generates a magnetic field that causes the stepper motor to move the particular number of steps to bias the servo-regulator diaphragm 110 and move the valve member 122 for establishing the requested low or high-capacity gas flow rate. The valve controller 130 may further be configured to determine a particular motor step value that corresponds to the reference value that is indicative of a select capacity level or gas flow rate. The motor step value is used to determine an input to the coil 120 corresponding to the number of steps the motor must turn or move to bias the servo-regulator diaphragm 110 and move the valve member 122 to establish a gas flow rate (or pressure at outlet 105) corresponding to the reference value and/or desired capacity level.

Where the coil 120 is part of a solenoid as in FIG. 4, the valve controller 130 is configured to determine a particular input voltage signal (or magnitude) that corresponds to a low or high-capacity gas flow rate, and to apply the input voltage signal to the coil 120 to move the valve member 122 for establishing the requested low or high-capacity gas flow rate. The valve controller 130 may further be configured to determine a particular input voltage signal that will establish a particular gas flow rate that corresponds to the reference value or requested operating capacity level. The valve controller determines an input voltage signal to the coil 120 that will control the extent of movement of the valve member 122 to establish the desired gas flow rate (or pressure at outlet 105) corresponding to the reference value or desired capacity level.

Accordingly, the valve controller 130 in FIG. 4 is configured to determine an input signal to the coil 120 (that is associated with a particular motor step value, or a particular voltage level), which will cause the valve member 122 to move relative to the valve seat 102 to establish the requested low capacity gas flow rate or high-capacity gas flow rate through the gas valve unit 100, or the particular gas flow rate corresponding to a reference value indicative of an operating capacity level. The gas valve unit 100' further includes a setting adjustment device 140 that enables a user to provide a setting adjustment input for calibrating at least one desired gas flow rate. More preferably, the setting adjustment device 140 enables a user to make an entry for providing first and second setting adjustment inputs, for calibrating at least a low-capacity gas flow rate and a high-capacity gas flow rate, respectively.

Referring to FIG. 1, the setting adjustment device 140 may comprise a dip switch. The dip switch may be a linear six position dip switch, or a rotary dip switch, as shown at 140 in FIG. 1. The rotary dip switch may provide a setting adjustment input for adding a number of steps when turned in one direction, or for decrementing a number of steps when turned in the opposite direction. The dip switch position or setting may be used to increment or decrement the determined number of stepper motor steps required to establish a given gas flow rate, which is used to adjust the input signal to the coil 120 that will yield the total adjusted number of motor steps to be made.

In the first gas valve unit 100 shown in FIG. 1, the setting adjustment device comprises a rotary dip switch that provides at least a first setting adjustment input, from which a control variable may be obtained that is utilized to adjust the input signal to coil 120 to adjust at least one gas flow rate. Where the coil 120 is part of a stepper motor, the first setting adjustment input may be used to determine a control variable such as a "step" value for incrementing or decrementing the determined number of stepper motor steps for biasing the servo-regulator diaphragm 110 and displacing valve member 122 to establish a low-capacity gas flow rate. Likewise, the second setting adjustment input may be used to determine a control variable or "step" value for incrementing or decrementing the determined number of motor steps to bias the servo-regulator diaphragm 110 and displace valve member 122 to establish the high-capacity gas flow rate. Thus, if the gas valve unit 100 in FIG. 1 is set at the time of manufacture to provide an input signal to coil 120 for moving the stepper motor a determined number of steps to bias the servo-regulator diaphragm 110 to establish a high-capacity gas flow rate, the setting adjustment device provides a setting adjustment input from which a control variable (e.g., value for incrementing/decrementing the number of motor steps) is utilized to adjust the input signal to the coil 120, to thereby enable field adjustment of the high-capacity gas flow rate.

Where the coil 120 is part of a solenoid as in the gas valve unit 100' in FIG. 4, the first setting adjustment input may be used to determine a control variable such as a "voltage" offset for incrementing or decrementing a given input voltage signal to the coil 120 for moving the valve member 122 and establishing a low-capacity gas flow rate. Likewise, the second setting adjustment input may be used to determine a control variable or voltage offset for incrementing or decrementing the input voltage signal to the coil 120, to adjust the movement of valve member 122 in establishing a high-capacity gas flow rate. Thus, if the gas valve unit 100' in FIG. 4 is set at the time of manufacture to provide a given input signal to coil 120 to move the valve member 122 to establish a high-capacity gas flow rate, the setting adjustment device 140 provides an adjustment input from which a control variable (e.g., voltage offset for incrementing or decrementing the input voltage) is utilized to adjust the input signal to the coil 120, to thereby enable field adjustment of the high-capacity gas flow rate.

In the second gas valve unit 100' shown in FIG. 4, it should be noted that the setting adjustment device 140 may comprise a pair of momentary push buttons 140A, 140B (instead of a dip switch). The pair of momentary push buttons 140A, 140B provide for user input of at least a first setting adjustment input for adjusting an input signal to a coil 120, such that at least one gas flow rate setting of the gas valve unit is field adjustable by the setting adjustment device. Alternatively, the pair of momentary push buttons may comprise a single momentary push button that is depressed for a minimum time for input of adjustment in one direction, or depressed for a second minimum time for input of adjustment in the opposite direction. Thus, a single momentary push button may be equivalent to a pair of push buttons. Accordingly, the setting adjustment device 140 may comprise a dip switch, a rotary dip switch, or momentary push buttons, or any other equivalent components that are suitable for enabling user entry of an adjustment input.

Accordingly, in another aspect of the present disclosure, one preferred embodiment of a field adjustable gas valve unit 100' includes a setting adjustment device 140 for providing a setting adjustment input for calibrating at least one desired gas flow rate, where the setting adjustment device 140 comprises a pair of momentary push buttons 140A, 140B. The gas valve unit 100' includes a valve controller 130 in communication with the setting adjustment device 140 and a coil 120, where the valve controller 130 is configured to receive an activation signal and to responsively send an input signal to the coil 120 to move a valve member 122 to establish at least one desired gas flow rate, wherein the valve controller 130 is configured to adjust the input signal to the coil 120 based on the setting adjustment input, to thereby enable field adjustment of the level of the at least one desired gas flow rate.

Figure 5:
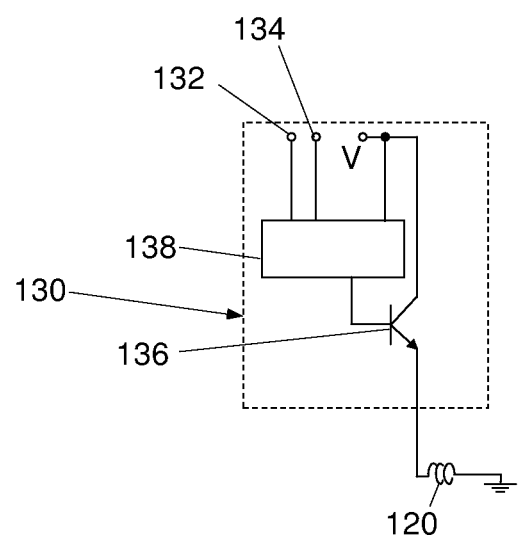
FIG. 5 shows a schematic diagram of a valve controller for use in connection with the above gas valve unit embodiments, according to the principles of the present disclosure.

Referring to FIG. 5, a schematic diagram of the valve controller 130 is provided. The valve controller 130 may comprise a microprocessor 138 that is in communication with the first connection 132 configured to receive a high-stage activation signal, and with the second connection 134 configured to receive a low-stage activation signal (from a two-stage system controller 20). Alternatively, a pulse-width-modulation or other equivalent signal may be received (via 134), which signal indicates a desired operating capacity level. The microprocessor 138 may control a switching device 136 to controllably switch a voltage on and off to provide a pulse-width modulated voltage signal to a stepper motor controller for controlling one or more coils 120 (FIG. 1), to thereby control the gas flow rate of the gas valve unit 100. Alternatively, the microprocessor 138 may control the switching device 136 to provide pulse width modulation of a voltage for controlling an input voltage signal (e.g., voltage level) that can be applied to a coil 120.

In the various embodiments of a gas valve unit 100, the valve controller 130 may further employ a lookup table having a set of motor step values, which are used to determine the appropriate number of steps the stepper motor must move. For example, in the gas valve unit 100 in FIG. 1, the look-up table may include a set of motor step values that correspond to a number of reference values (between 0 and 5 volts), wherein the valve controller 130 selects from the look-up table a motor step value (or an input signal to a coil 120 that will yield the number of motor steps), which corresponds to the reference value provided in the activation signal from a system controller 20. The valve controller 130 is in communication with the setting adjustment device 140, and is configured to adjust the input signal to a coil 120 (e.g., an input signal to at least one stepper motor coil 120 that will yield the required number of stepper motor steps), based on the setting adjustment input. This feature accordingly enables field adjustment of a factory-set gas flow rate setting.

Thus, it will be understood by those skilled in the art that the above described embodiments and combinations thereof may be employed in various types of heating systems with any combination of the above disclosed features, without implementing the others. It will be understood that the stepper motor driven gas valve and controller described above may be utilized in other forms of heating and cooling equipment, including water heater and boiler appliances. Accordingly, it should be understood that the disclosed embodiments, and variations thereof, may be employed without departing from the scope of the invention.

What is claimed is:

1. A gas valve unit for controlling a gas flow rate to a combustion apparatus, the gas valve unit comprising:
a valve member moveable relative to a valve seat, wherein an input signal to a coil controls the extent of movement of the valve member relative to the valve seat to control a gas flow rate through the gas valve unit to the combustion apparatus;
a setting adjustment device that provides a setting adjustment input for calibrating at least one gas flow rate manufacturer-set in the gas valve unit; and
a valve controller in communication with the setting adjustment device and the coil, the valve controller being configured to receive an activation signal prompted by a thermostat and to responsively send the input signal to the coil to move the valve member to establish at least one desired gas flow rate corresponding to the activation signal;
the valve controller further configured to use a first value of the setting adjustment input from the setting adjustment device to calibrate a manufacturer-set high-capacity gas flow rate to obtain a calibrated high-capacity gas flow rate for a gas, and to use a second value of the setting adjustment input from the setting adjustment device to calibrate a manufacturer-set low-capacity gas flow rate to obtain a calibrated low-capacity gas flow rate for the gas, where in a single calibration, calibrating one of the high-capacity gas flow rate and the low-capacity gas flow rate is not effective to calibrate the other of the high-capacity gas flow rate and the low-capacity gas flow rate;
the valve controller further configured to:
calibrate the manufacturer-set low- or high-capacity gas flow rate to adjust the corresponding low or high outlet pressure; and
adjust the delimited range of outlet pressures in accordance with the adjusted low or high outlet pressure to obtain an adjusted range of outlet pressures having a rate of change different from a rate of change of the delimited range.

2. The gas valve unit of claim 1, wherein the valve controller is further configured to use the first or second value of the setting adjustment input to field-adjust a gas flow rate that is neither high- nor low-capacity.

3. The gas valve unit of claim 1, wherein the setting adjustment device comprises momentary push buttons.

4. The gas valve unit of claim 1, operable to establish a low outlet pressure corresponding to the manufacturer-set low-capacity gas flow rate and to establish a high outlet pressure corresponding to the manufacturer-set high-capacity gas flow rate, the low and high outlet pressures delimiting a range of outlet pressures that the gas valve unit is operable to establish.

5. The gas valve unit of claim 2, wherein the valve controller is configured to utilize said control variable that comprises a stepper motor step value, which is used to adjust the input signal to the coil to cause a stepper motor to move the required number of steps to adjust the valve member relative to the valve seat to establish at least one adjusted gas flow rate.

6. The gas valve unit of claim 5, wherein the gas valve unit further includes:
a main diaphragm chamber,
a main diaphragm in the main diaphragm chamber that controllably displaces a valve relative to a valve opening in response to changes in pressure in the main diaphragm chamber, to thereby permit adjustment of the flow of fuel through the valve opening;
a servo-regulator diaphragm configured to regulate fluid flow to the main diaphragm chamber, to control the rate of fuel flow through the valve opening; and
a stepper motor configured to move in a stepwise manner to bias the servo-regulator diaphragm for regulating fluid flow to the diaphragm chamber to move the valve member relative to the valve seat, to thereby control the gas flow rate through the gas valve unit.

7. The gas valve control of claim 6, wherein the valve controller is configured to determine a select motor step value that corresponds to the activation signal, and to move the stepper-motor to the selected motor step value for biasing the servo-regulator diaphragm, to thereby establish a particular gas flow rate that corresponds to the activation signal.

8. The gas valve unit of claim 7, wherein the activation signal is a milliamp signal in the range of from 20 to 180 milliamps, and the valve controller is configured to determine a reference value from the activation signal that the valve controller uses to determine the number of stepper motor steps for establishing the particular gas flow rate corresponding to the activation signal.

9. The gas valve unit of claim 6, further comprising a look-up table associated with the valve controller, which includes a set of motor step values that correspond to a number of reference values, wherein the valve controller is configured to select a motor step value from the look up table that corresponds to the reference value associated with the activation signal.

10. The gas valve unit of claim 9, wherein the set of motor step values correspond to a plurality of positions of the stepper motor for adjusting the gas flow rate, said plurality of positions ranging from a full capacity flow position to a minimum capacity flow that is 15 percent of the full capacity flow.

11. A gas valve unit for controlling a gas flow rate to a combustion apparatus, the gas valve unit comprising:
a valve member that moves relative to a valve seat in response to a magnetic field generated by a coil, wherein an input signal to the coil controls the extent of movement of the valve member relative to the valve seat to control a gas flow rate through the gas valve unit to the combustion apparatus;
the gas valve unit being operable to establish a low outlet pressure corresponding to a manufacturer-set low-capacity gas flow rate and to establish a high outlet pressure corresponding to a manufacturer-set high-capacity gas flow rate, the low and high outlet pressures delimiting a range of outlet pressures that the gas valve unit is operable to establish in relation to position of the valve member relative to the valve seat;
a setting adjustment device that provides a setting adjustment input for calibrating at least one gas flow rate manufacturer-set in the gas valve unit; and
a valve controller in communication with the setting adjustment device and the coil, the valve controller being configured to receive an activation signal prompted by a thermostat and to responsively send the input signal to the coil to move the valve member to establish at least one desired gas flow rate corresponding to the activation signal;
the valve controller further configured to:
calibrate the manufacturer-set low- or high-capacity gas flow rate to adjust the corresponding low or high outlet pressure; and adjust the delimited range of outlet pressures in accordance with the adjusted low or high outlet pressure to obtain an adjusted range of outlet pressures having a rate of change different from a rate of change of the delimited range.

12. The gas valve unit of claim 11, where the setting adjustment device provides the setting adjustment input from which a control variable may be obtained that is utilized to adjust the input signal to the coil.

13. The gas valve unit of claim 11, wherein the setting adjustment device comprises momentary push buttons.

14. The gas valve unit of claim 11, wherein calibrating the high-capacity gas flow rate is not effective to calibrate the low-capacity gas flow rate, and calibrating the low-capacity gas flow rate is not effective to calibrate the high-capacity gas flow rate.

15. The gas valve unit of claim 11, further configured to field-adjust a gas flow rate between calibrated high and low capacity gas flow rates.

16. The gas valve unit of claim 15, wherein the valve member is moved by the coil, without any mechanical linkage to a diaphragm, to directly vary an opening area relative to the valve seat for controlling a gas flow rate.

17. The gas valve unit of claim 16, wherein the valve controller is configured to determine the input signal to the coil that corresponds to the activation signal, and to adjust the input signal based on the setting adjustment input, to thereby establish an adjusted gas flow rate that corresponds to the activation signal.

18. The gas valve unit of claim 17, wherein the activation signal is a milliamp signal in the range of from 20 to 180 milliamps, and the valve controller is configured to determine a reference value from the activation signal that the valve controller uses to determine an input voltage signal for establishing a particular gas flow rate corresponding to the activation signal.

19. The gas valve unit of claim 18, further comprising a look-up table associated with the valve controller, which includes a set of input voltage values that correspond to a number of reference values, wherein the valve controller is configured select an input voltage value from the look up table that corresponds to the reference value associated with the activation signal.

20. The gas valve unit of claim 19, wherein the set of input voltage values correspond to a plurality of positions of the valve member for adjusting the gas flow rate, said plurality of positions ranging from a full capacity flow position to a minimum capacity flow that is 15 percent of the full capacity flow.

* * * * *